United States Patent
Kuo

(10) Patent No.: US 12,422,516 B2
(45) Date of Patent: Sep. 23, 2025

(54) POSITIONING A DEVICE

(71) Applicant: Nokia Technologies Oy, Espoo (FI)

(72) Inventor: Ping-Heng Kuo, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 452 days.

(21) Appl. No.: 18/019,180

(22) PCT Filed: Aug. 4, 2020

(86) PCT No.: PCT/EP2020/071841
§ 371 (c)(1),
(2) Date: Feb. 1, 2023

(87) PCT Pub. No.: WO2022/028671
PCT Pub. Date: Feb. 10, 2022

(65) Prior Publication Data
US 2023/0288523 A1    Sep. 14, 2023

(51) Int. Cl.
*G01S 5/02*  (2010.01)
*G01S 5/00*  (2006.01)

(52) U.S. Cl.
CPC .......... *G01S 5/0244* (2020.05); *G01S 5/0027* (2013.01); *G01S 5/011* (2020.05); *G01S 5/0236* (2013.01)

(58) Field of Classification Search
CPC ...... G01S 5/0244; G01S 5/0027; G01S 5/011; G01S 5/0236; H04W 64/00
See application file for complete search history.

(56) References Cited

U.S. PATENT DOCUMENTS

| 10,715,951 | B1   | 7/2020  | Ratasuk et al. |
| 2004/0258012 | A1* | 12/2004 | Ishii ...................... H04W 64/00 342/450 |
| 2022/0276373 | A1* | 9/2022  | Bienas .................. H04W 4/023 |

FOREIGN PATENT DOCUMENTS

| WO | WO 2020/060119 A1 | 3/2020 |
| WO | 2021/197986 A1 | 10/2021 |
| WO | 2022/022892 A1 | 2/2022 |

OTHER PUBLICATIONS

"3rd Generation Partnership Project; Technical Specification Group Radio Access Network; LTE Positioning Protocol (LPP) (Release 16)", 3GPP TS 37.355, V16.0.0, Mar. 2020, pp. 1-281.

"New SID on NR Positioning Enhancements", 3GPP TSG RAN Meeting #86, RP-193237, Agenda: 9.1.1, Qualcomm Incorporated, Dec. 9-12, 2019, 4 pages.

(Continued)

*Primary Examiner* — Kabir A Timory
(74) *Attorney, Agent, or Firm* — Carter, DeLuca & Farrell LLP

(57) ABSTRACT

Apparatuses and methods for positioning are disclosed. In the arrangement a request for information associated with location of an apparatus is received by the apparatus, the request including an indication of a plurality of sets of radio accesses and information of positioning integrity. The apparatus determines based on the information of positioning integrity whether a position estimate based on a set of radio accesses of the indicated plurality of sets of radio accesses is to be reported in response to the request and responds the request according to the determining.

19 Claims, 6 Drawing Sheets

Send a request to a device comprising information of a plurality of sets of radio accesses and positioning integrity — 200

Receive a response from the device, the response being determined by the device based on the information and including a position estimate based on a selected set of radio access or a failure notification — 202

(56) References Cited

OTHER PUBLICATIONS

"Revised SID: Study on NR Positioning Enhancements", 3GPP TSG RAN Meeting #88e, RP-200928, Agenda: 9.1.1, CATT, Intel Corporation, Jun. 29-Jul. 3, 2020, 4 pages.
"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.0.0, Mar. 2020, pp. 1-107.
International Search Report and Written Opinion received for corresponding Patent Cooperation Treaty Application No. PCT/EP2020/071841, dated Apr. 7, 2021, 16 pages.
Commuication pursuant to Article 94(3) EPC received for corresponding European Patent Application No. 20753904.0, dated Mar. 21, 2024, 3 pages.
"$3^{rd}$ Generation Partnership Project; Technical Specification Group Radio Access Network; NG Radio Access Network (NG-RAN); Stage 2 functional specification of User Equipment (UE) positioning in NG-RAN (Release 16)," 3GPP TS 38.305 V16.1.0, Jul. 2020.
"$3^{rd}$ Generation Partnership Project; Technical Specification Group Services and System Aspects; Study on positioning use cases; Stage 1 (Release 16)," 3GPP TR 22.872 V16.1.0., Sep. 2018.

\* cited by examiner

POSITIONING A DEVICE

CROSS REFERENCE TO RELATED APPLICATION

This patent application is a U.S. National Stage application of International Patent Application Number PCT/EP2020/071841 filed Aug. 4, 2020, which is hereby incorporated by reference in its entirety.

FIELD

The present disclosure relates to methods, apparatuses and computer program products for providing positioning information for a device in a communication system.

BACKGROUND

A communication system is a facility that enables communication sessions between two or more entities such as communication devices, base stations/access points and/or other nodes by providing carriers between the various entities involved in the communications. Access to the communication system may be via an appropriate communications device or terminal. In mobile communication system the access is provided via wireless or radio interface. A communication device of a user is commonly referred as a user equipment (UE). A communications device is provided with an appropriate signal receiving and transmitting apparatus for enabling communications, for example enabling access to an access network of the communication system or communications directly with other communications devices. The communication system and associated devices typically operate in accordance with a given standard or specification which sets out what the various entities associated with the system are permitted to do and how that should be achieved.

Communication systems can support positioning of devices, for example mobile user equipment (UE) and other communication devices. For example, third generation partnership project (3GPP) 5G standards define a concept known as new radio (NR) positioning which is based on use of a location management function (LMF). The LMF can be provided by a location server. The location server or the like collects and distributes information related to positioning to the other entities involved in the positioning procedures. The information can comprise, e.g., UE capabilities, assistance data, measurements, position estimates and so on. Positioning provides an enabler for various vertical applications and use cases that can be provided for users of the communication system. Knowledge relating to precise or at least approximate but accurate enough position of devices can be useful for providing applications such as various location-based services, autonomous driving, Internet of Things (IoT), industrial IoT and so forth. Accurate positioning can be provided based on global navigation satellite system (GNSS) techniques such as Global Positioning System (GPS) or Galileo™. GNSS techniques however may not be able to provide sufficiently accurate positioning in all occasions. This can be the case, for example, when connectivity to the positioning satellites is lost or hindered for whatever reason. A more specific example of such circumstances are indoor scenarios such as factory automation or warehouse management and, e.g., positioning in tunnels and the like locations. A suggestion has been to use radio access technology (RAT) dependent positioning methods which are based on measurement of downlink/uplink signals in a radio access system instead of, or in addition to, use of positioning satellites.

SUMMARY

According to an aspect, there is provided an apparatus comprising at least one processor and at least one memory including a computer program code, the at least one memory and computer program code configured to, with the at least one processor, cause the apparatus at least to: receive a request for information associated with location of the apparatus, the request comprising an indication of a plurality of sets of radio accesses and information of positioning integrity, determine based on the information of positioning integrity whether a position estimate based on a set of radio accesses of the indicated plurality of sets of radio accesses is to be reported in response to the request, and respond to the request according to the determining.

According to another aspect there is provided an apparatus for a communication system for obtaining information of a location of a device, comprising at least one processor and at least one memory including a computer program code, the at least one memory and computer program code configured to, with the at least one processor, cause the apparatus at least to: send, to the device to be located, a request for information associated with the location of the device, the request comprising an indication of a plurality of sets of radio accesses and information of positioning integrity, and receive from the device a response comprising a position estimate determined by the device based on the information of positioning integrity, wherein the device has determined whether a position estimate based on a set of radio accesses of the indicated plurality of sets of radio accesses is to be reported in response to the request and responded the request according to the determining.

According to another aspect there is provided a method for determining location information for a device, comprising: receiving, at the device, a request for information associated with the location of the device, the request comprising an indication of a plurality of sets of radio accesses and information of positioning integrity, determining, by the device, based on the information of positioning integrity whether a position estimate based on a set of radio accesses of the indicated plurality of sets of radio accesses is to be reported in response to the request, and responding the request according to the determining.

According to yet another aspect there is provided a method for determining location of a device, comprising: sending, from a communication network to a device to be located, a request for information associated with the location of the device, the request comprising an indication of a plurality of sets of radio accesses and information of positioning integrity, and receiving from the device, a response comprising a position estimate determined by the device based on the information of positioning integrity, wherein the device has determined whether a position estimate based on a set of radio accesses of the indicated plurality of sets of radio accesses is to be reported in response to the request and responded the request according to the determining.

In accordance with more detailed aspects of the apparatuses and methods, the indication comprises a primary set of radio accesses and at least one secondary set of radio accesses. A first position estimate can be derived based on the primary set of radio accesses, where after it can be determined whether the first position estimate satisfies positioning integrity according to the information of positioning integrity. In response to determining that the first positioning estimate satisfies the positioning integrity according to the information of positioning integrity, the first positioning estimate is reported, and in response to determining that the first positioning estimate does not satisfy the positioning integrity according to the information of positioning integrity, at least one second positioning estimate is derived based on the at least one secondary set of radio accesses.

In accordance with another specific aspect position estimates are derived for the indicated sets of radio accesses, at least one position estimate is determined that satisfies positioning integrity according to the information of positioning integrity, and the determined at least one position estimate is reported.

A position estimate with the best position integrity performance can be determined and the determined best position estimate can be reported.

Rules for selection of a position estimate for reporting can be received, and a position estimate can be selected amongst derived position estimates accordingly.

The information of positioning integrity may comprise the value of at least one of maximum tolerable error, maximum likelihood of integrity risk, number of line of sight paths, alert limit, protection level, time to alert, integrity risk, or integrity event, and/or a rule that the report shall include at least one of the position estimate with lowest error, the position estimate with lowest likelihood of error exceeding a maximum tolerable error, or the position estimate corresponding to a set of radio accesses where a largest number of line of sight paths have been observed.

The report may comprise at least one of indication of positioning integrity failure, index of the set of radio accesses associated with the reported position estimate, or index of a set of radio accesses associated a position estimate determined as integrity failure.

The request may comprise a positioning protocol request from a location management function, LMF, of a 3GPP communication system. The radio accesses may comprise transmit/receive points, TRPs, user equipment, UE, or TX/RX beam configurations or spatial relations according to a 3GPP radio access technology, RAT. The device may comprise a user equipment, UE, that is configured for UE-assisted and/or UE-based positioning.

A computer software product embodying at least a part of the herein described functions may also be provided. In accordance with an aspect a computer program comprises instructions for performing the methods described herein.

BRIEF DESCRIPTION OF DRAWINGS

Some aspects will now be described in further detail, by way of example only, with reference to the following examples and accompanying drawings, in which.

DETAILED DESCRIPTION OF EXAMPLES

The following description gives an exemplifying description of some possibilities to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment. Single features of different examples and embodiments may also be combined to provide other embodiments.

Wireless communications systems. often referred to as cellular systems, provide wireless communications to devices connected therein. Typically, an access point such as a base station is provided for enabling the communications.

In the following, different scenarios will be described using, as an example of an access architecture, a 3GPP 5G radio access architecture. However, embodiments are not limited to such an architecture. Some examples of other options for suitable systems are the universal mobile telecommunications system (UMTS) radio access network (UTRAN or E-UTRAN), long term evolution (LTE), LTE-A (LTE advanced). wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS) or any combination thereof.

Figure 1:
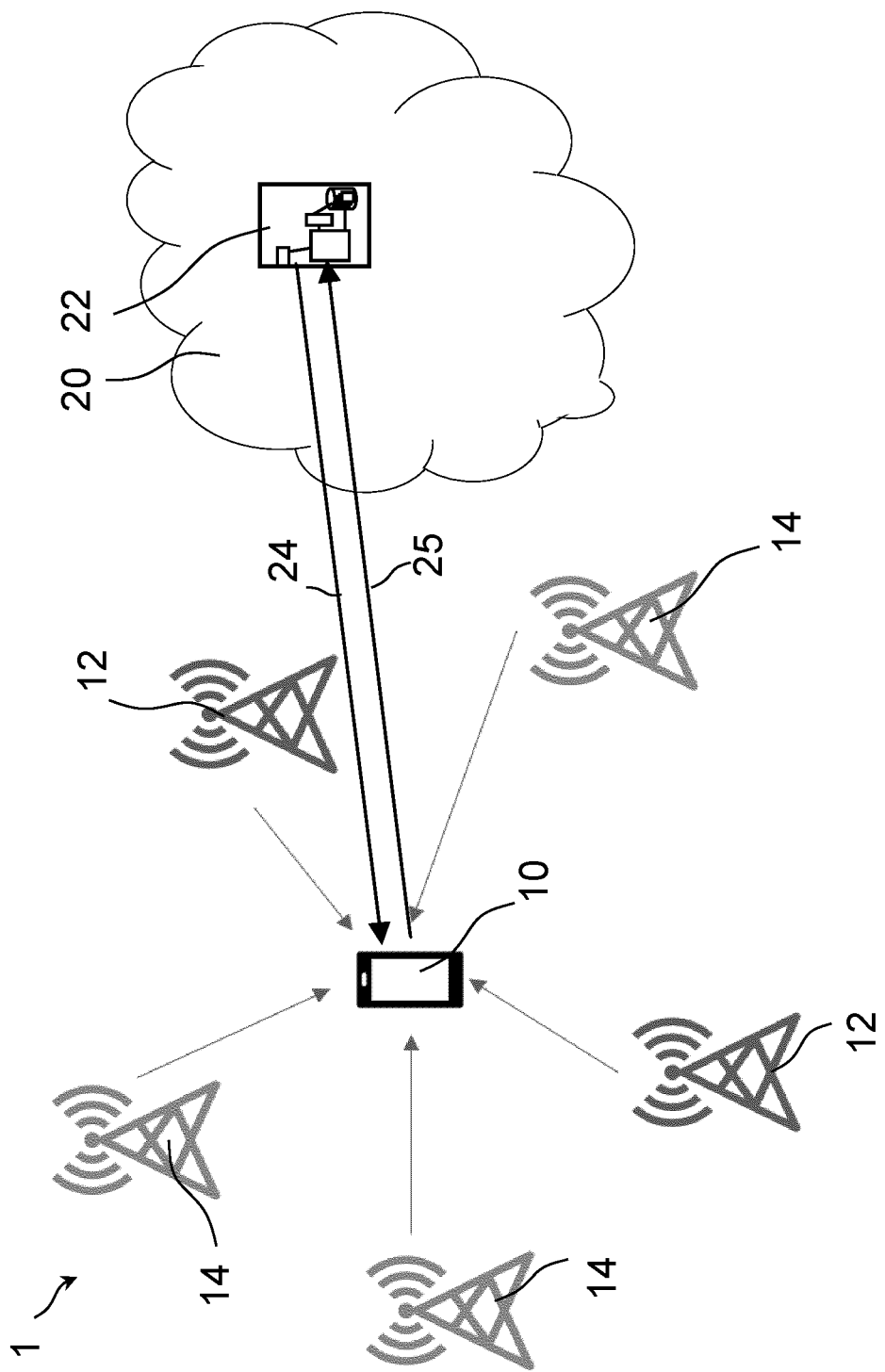
FIG. 1 illustrates an example of a system where the invention can be practised.

FIG. 1 which shows a wireless communication system comprising an access system 1. The radio access system 1 comprises a plurality of access points, or base stations, 12 and 14. An access point can comprise any node that can transmit/receive radio signals (e.g., a TRP, a 3GPP 5G base station such as gNB, eNB, a user device such as a UE and so forth). A communications device 10 is located in the service area of the radio access system 1, and the device 10 can thus listen to the access points 12, 14.

The communications device 10 may be any suitable communications device. A wireless communications device may be provided by any device capable of sending and receiving radio signals. Non-limiting examples comprise a mobile station (MS) or user equipment (UE) (e.g., a mobile device such as a mobile phone or what is known as a 'smart phone'), a computer provided with a wireless interface card or other wireless interface facility (e.g., USB dongle), personal data assistant (PDA) or a tablet provided with wireless communication capabilities, machine-type communications (MTC) devices, Internet of Things (IoT) type communications devices or any combinations of these or the like. The communications device may be provided as part of another device. The device may receive signals over an air or radio interface via appropriate apparatus for receiving and may transmit signals via appropriate apparatus for transmitting radio signals.

Figure 7:
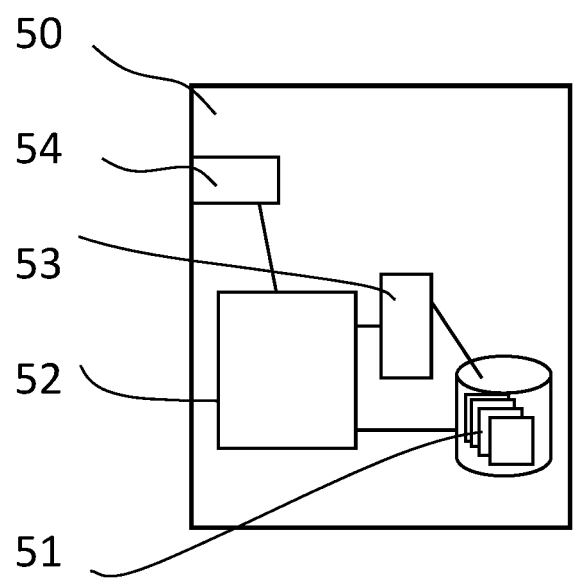
FIG. 7 is an example of a control apparatus.

A communications device may be provided with data processing apparatus comprising at least one processor and at least one memory. FIG. 7 shows an example of a data processing apparatus 50 comprising processor(s) 52, 53 and memory or memories 51. FIG. 7 further shows connections between the elements of the apparatus and an interface for connecting the data processing apparatus to other components of the device 10.

The at least one memory may comprise at least one ROM and/or at least one RAM. The communications device may comprise other possible components for use in software and hardware aided execution of tasks it is designed to perform, including control of access to and communications with access systems and other communications devices, and implementing the herein described features of positioning of the device. The at least one processor can be coupled to the at least one memory. The at least one processor may be configured to execute an appropriate software code to implement one or more of the following aspects. The software code may be stored in the at least one memory, for example in the at least one ROM.

FIG. 1 shows further a wider communication system 20. For example, the communication system 20 may comprise what is often called a public land mobile network (PLMN). FIG. 1 shows a location information entity 22 configured to provide location information of devices. The architecture and various components of the communication system may be based on the 3GPP 5G standard, or any other appropriate standard.

In a 5G based network system positioning services can be provided by means of a new radio (NR) positioning architecture. A location information entity thereof comprises a location management function (LMF). The LMF can be provided for example by an appropriately configured location server apparatus or server apparatuses. LMF can be integrated with other elements of the communication system 20. The LMF can be configured to collect and distribute information related to positioning of the communication device 10. Information of the position of the device can be used by applications such as location-based services, autonomous driving, Internet of Things (IoT), industrial IoT and so forth. This specific description relates to positioning arrangements where at least a part of the location data is provided based on measurements and determinations in the radio access system instead of, or in addition to, of positioning satellites.

The basic principles of Radio access technology (RAT) dependent positioning methods are known. These can be based on measurement of downlink/uplink signals with the base stations. An example of such is provided by 3GPP standards defining measurements based on, e.g., positioning reference signals/sounding reference signal (PRS/SRS) and base stations/transmit-receive points (TRPs)/access points.

FIG. 1 further shows a request 24 for location information and a response 25 thereto. Detailed explanation of these messages is given later in the description.

The principles of positioning integrity is known from conventional GNSS based positioning methods. Position integrity is considered an important design aspect for applications that require accurate positioning. Illustrative and non-limiting examples of such applications include autonomous applications, e.g., autonomous driving and industrial robots. Emerging applications relying on high-precision positioning technology can require high integrity and reliability in addition to accuracy. Position integrity can be understood as a measure of trust that can be placed in the correctness of information by a navigation system. Integrity can also be considered to include the ability to provide timely warnings in case of failure. The current positioning integrity concepts thus define information relating to aspects such as "how much we can trust about the positioning estimation results" and "how quickly we can recover from situations where the trustable positioning is deemed to be unavailable". A computed position is only considered as "valid" if its expected error is smaller than a tolerated maximum error. Otherwise, the position is considered as "not trustable" and hence invalid. An example of this is illustrated in FIG. 2.

Before explaining examples of the herein disclosed principles in more detail, certain metrics that may be used in relation to position integrity are briefly explained. Alert Limit (AL) refers to the maximum error the system can tolerate. The value of AL can depend on the application. Protection Level (PL) is an estimate of the maximum possible error in the determined position. In normal operation PL<AL. Time To Alert (TTA) can be used to denotes maximum allowable time elapsed from the onset of the navigation system being out of tolerance until the user equipment enunciates the alert. Integrity Risk (IR) denotes a probability that the position error is larger than the Alert Limit (AL), and the user is not warned within the Time To Alert (TTA). Integrity event occurs when the positioning error is greater than the protection level, and the receiver does not trigger an alert within the TTA. Integrity event can be expressed as number of events per time unit.

Figure 2:
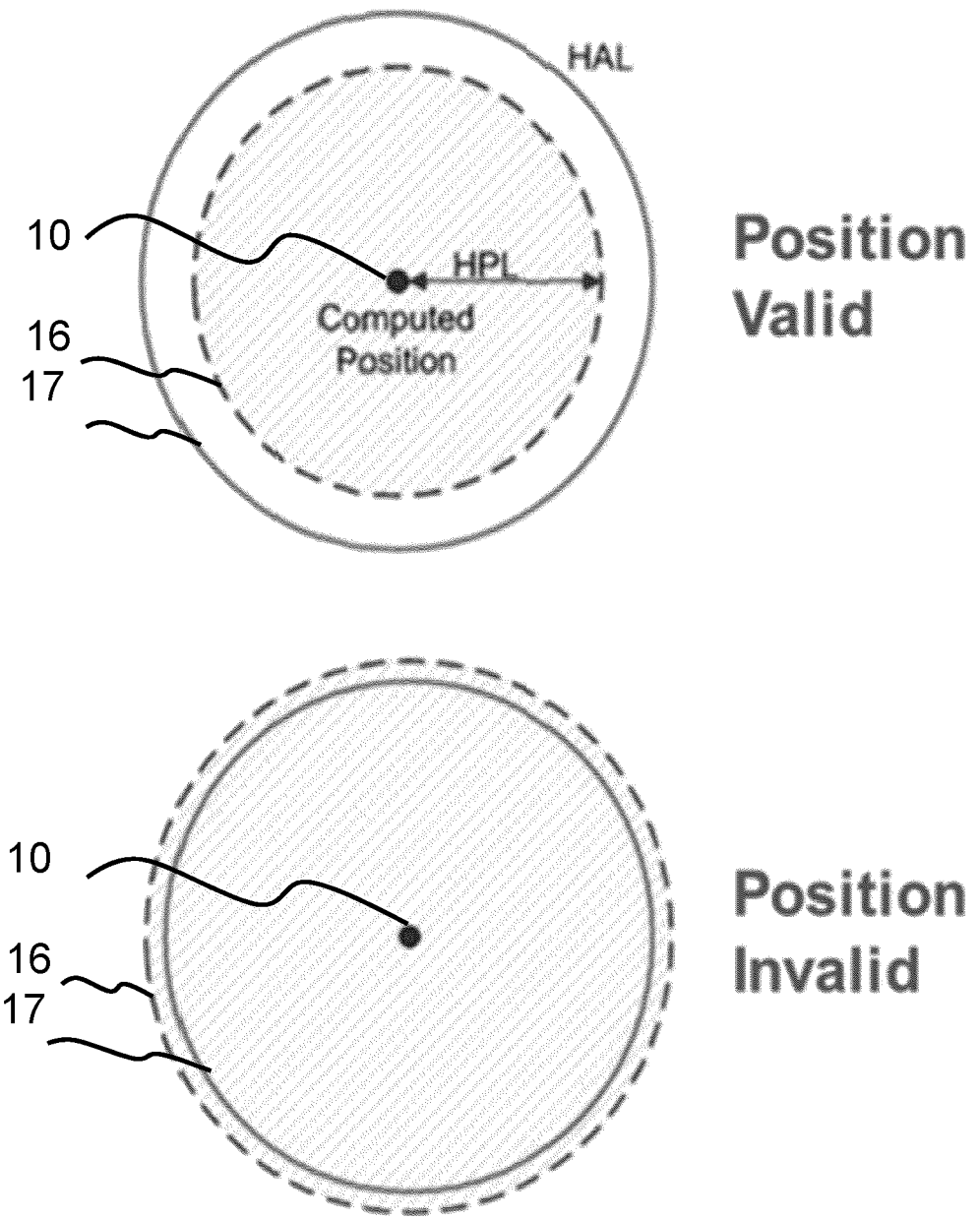
FIG. 2 shows examples of valid and invalid position estimates.

FIG. 2 illustrates location of a device 10 and Protection Level (PL) 16 and Alert Limit (AL) 17. In the two-dimensional FIG. 2 the parameters are labelled as HAL (Horizontal Alert Limit) and Horizontal Protection Level (HPL). The computed position of device 10 is only considered as "valid" if its expected error—in this example HPL—is smaller than the maximum error it can tolerate—in this example HAL. Otherwise, the position is considered as "not trustworthy" and hence can be disregarded as invalid.

Once there is an integrity risk for the positioning session, the system should try to recover as soon as possible to ensure the application can seamlessly acquire the device location with the required accuracy. For both UE-based and UE-assisted positioning, measurements across multiple access points should be conducted and reported to the LMF, whereat the LMF selects the set of access points. The following proposes how to avoid inaccurate positioning due to selection of access points with bad radio conditions.

This can be exemplified by considering a specific scenario of RAT-dependent UE-based or UE-assisted positioning where the LMF can select and forward to the UE a set of transmit/receive points (TRPs) to be involved for positioning. The UE can then conduct measurements across multiple TRPs and report them to the LMF. Conventionally the selection of the TRPs is done by the LMF based on, e.g., historical data from the past. However, the LMF does not have an accurate knowledge, and often has no knowledge about the instantaneous radio conditions and/or UE status, e.g., the quality of the line of sight (LoS) path of a given TRP, at the time when the measurements are conducted. Due to this it is possible that the LMF instructs the UE to measure a PRS from a TRP with unfavourable radio conditions, which can result in inaccurate positioning because of, e.g., multi-paths. When the error exceeds the maximum tolerable error, there is an integrity risk. The LMF may only identify the integrity risk only after the position estimate is reported. The LMF may then attempt to alleviate the integrity risk by conducting another positioning session by selecting a different set of TRPs or changing a positioning method. This handling can result in an increased latency, and the positioning system may become temporarily unavailable.

The following describes in a way of examples how to alleviate these issues. The device to be located can be configured to conduct position estimate generation based on multiple sets of accesses indicated to it by a location information entity at the communication system.

Figure 3:
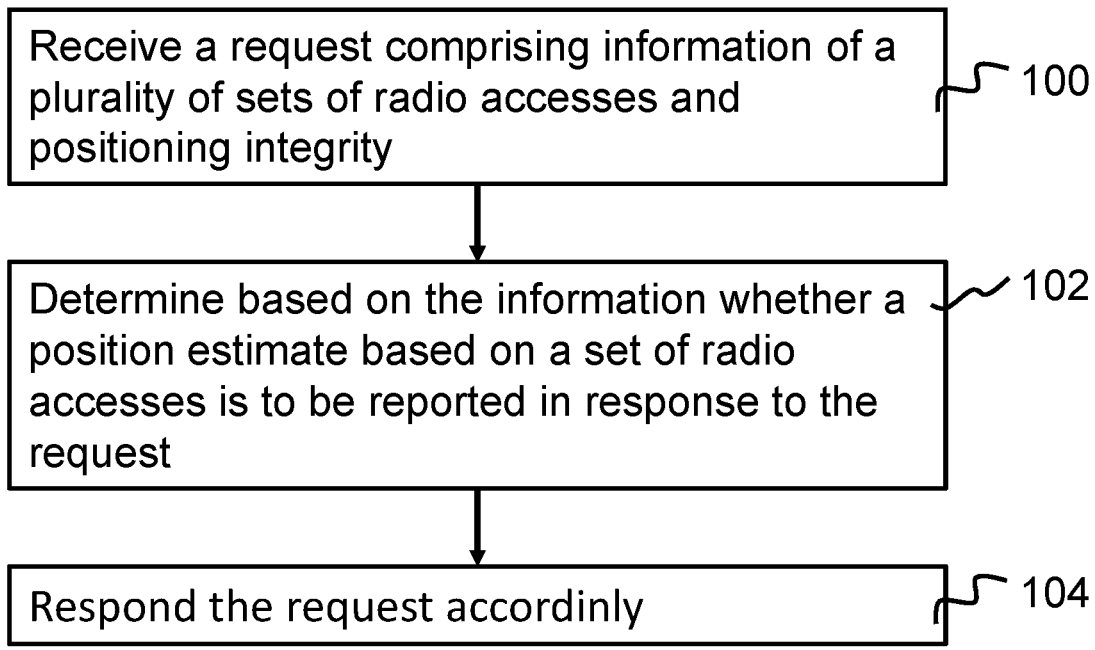
FIGS. 3 to 6 are flowcharts for operation according to certain examples.

FIG. 3 shows an example for operation at a device for determining location of the device. The device receives at 100 from the location information entity a request for information associated with the location of the device. The received request can comprise an indication of a plurality of sets of radio accesses. Information of positioning integrity can also be included in the request. The device then determines at 102, based on the information of positioning integrity, whether a position estimate based on a set of radio accesses of the indicated plurality of sets of radio accesses is to be reported in response to the request. At 104 the request is responded according to the determining at 102. The response may include at least one position estimate or an indication of a position failure.

Positioning integrity is a parameter which the device can use in determining what and how, if anything, is to be reported in response. Position integrity may be given in various levels of rigidity. It can be defined as a required position integrity, or more leniently as an expected or desired position integrity. The device may be configured to use the position integrity value as a guidance and make a decision whether at least one position estimate is good enough to satisfy the criteria while taking also other criteria into account.

Figure 4:
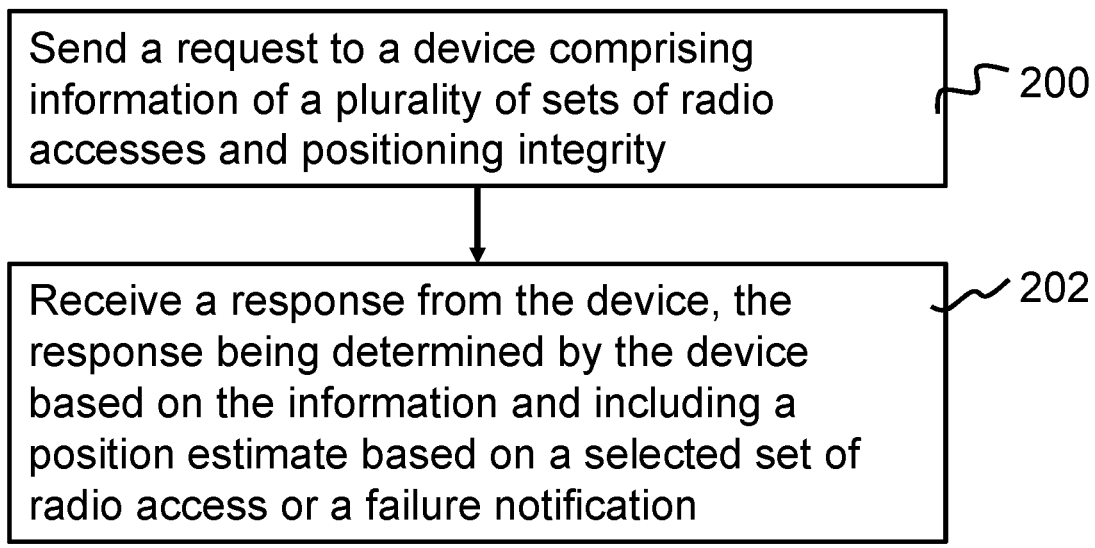

FIG. 4 shows an example for operation at a location information entity at the communication system that is configured for obtaining information regarding the location of the device. The location information entity sends at 200 from the communication system to the device to be located, a request for information associated with the location of the device. The request comprises an indication of a plurality of sets of radio accesses and information of positioning integrity. The entity then receives at 202 from the device a response comprising a position estimate determined by the device based on the information of positioning integrity. When generating the response, the device has determined whether a position estimate based on a set of radio accesses of the indicated plurality of sets of radio accesses is to be reported when responding the request and responded the request according to the determining. The response may include at least one position estimate or an indication of a position failure.

In accordance with an example, the indication comprises a primary set of radio accesses and at least one secondary set of radio accesses. In such scenario the device can derive a first position estimate based on the primary set of radio accesses and determine whether the first position estimate satisfies positioning integrity according to the information of positioning integrity. In response to determining that the first positioning estimate satisfies the positioning integrity according to the information of positioning integrity, the device can then report the first positioning estimate to the location information entity. If it is determined that the first positioning estimate does not satisfy the positioning integrity according to the information of positioning integrity, the device can derive at least one second positioning estimate based on the at least one secondary set of radio access points. The algorithm may be looped such that the device checks all secondary radio access until there is none left or until a satisfactory position estimate is generated. If no satisfactory estimate can be generated, a failure report may be generated.

In accordance with another example, position estimates are derived by the device for each of the indicated sets of radio access points. The device then determines if there is at least one position estimate that satisfies positioning integrity according to the information of positioning integrity. If such at least one position estimate is determined, the device reports the determined at least one position estimate. The reporting may comprise reporting only a determined position estimate with the best position integrity performance. The device may also receive rules for selection of a position estimate for reporting. The selecting of the position estimate amongst the derived position estimates will then be performed accordingly.

The device may perform determination in view of the reliability of its measurements and base its reporting on the determination. There are different possibilities to implement this.

The radio accesses can be indicated by way of radio access points such as the transmit/receive points (TRPs). In such instances the position estimation concept can be called TRP-set diversity where the device to be located derives information for two or more position estimates based on different sets of TRPs.

According to an example conditional secondary position estimation is performed at the device. The location information entity can be provided by a LMF of a communication network adapted to provide two or more sets of TRPs to a device to be positioned. The TRP sets can be categorized as a primary TRP set and at least one secondary TRP set. The device can then first derive a position estimate based on the primary TRP set. If the integrity performance of the position estimate based on the primary TRP set fails to meet the requirements, the device instigates measurement using at least one secondary TRP set. If the primary TRP set resulted satisfactory result, the position estimate based on the primary TRP set can be reported to the LMF without conducting the measurement based on the secondary TRP set.

According to another example selection diversity position estimation is provided. As above, a LMF can provide two or more sets of TRPs to a device to be positioned. The device then derives multiple position estimates based on the different TRP sets. Instead of reporting all of these estimates back to the LMF, the device can choose the estimate determined to have the best integrity performance and reports only the selected estimate to the LMF.

A location information request message sent to the device can be enhanced by additional information. The information can be carried by added information elements, IEs. The information can be used to indicate, inter alia, the set index/indices that a TRP pertains to, any conditions for the use of the enhanced location estimation, guidelines/rules for the device to select the position estimate that is to be reported to the LMF, the set index corresponding to the reported position estimate, and so forth.

The following describes more detailed examples for the integrity enhancement with reference to operation at a device comprising an user equipment (UE).

In accordance with an example for conditional position estimation by an UE a LMF provides a plurality of sets of TRPs to the UE. The UE then attempts to derive a position estimate based on a TRP set indicated by the LMF as a primary set. During integrity check it can be determined by the UE that the estimate error metric exceeds a predefined maximum tolerable limit. This can be so, e.g., because of determination that none of the measurements is conducted based on a sufficiently strong and/or reliable line-of-sight (LoS) conditions. If the integrity performance of the position estimate based on the primary TRP set fails to meet the requirement the UE will instigate measurement using a secondary TRP set. Otherwise, the estimate can be reported to the LMF without conducting the measurement in the secondary TRP set.

The LMF may provide various information to the UE in a trigger for UE-based positioning. The LMF may provide category information relating to TRP sets in each location request so that the UE can be notified whether a TRP belongs to the primary set or the secondary set. Moreover, the LMF may also provide instructions about when the UE shall instigate positioning based on the secondary TRP set, conditioned on the integrity evaluation of position obtained from the primary set. A new IE in a LPP request message may be added to indicate the conditions for the UE to determine if it should further derive position estimate using the secondary TRP set.

Table 1 below is an example of information that can be provided from a LMF to a UE. The example is based on Table 8.12.2.1-1 of 3GPP TS 38.305 V16.0.0, with added two new information elements shown in bold at the bottom.

TABLE 1

Information

Physical cell IDs (PCIs), global cell IDs (GCIs), and TRP IDs of candidate NR TRPs for measurement
Timing relative to the serving (reference) TRP of candidate NR TRPs
DL-PRS configuration of candidate NR TRPs
SSB information of the TRPs (the time/frequency occupancy of SSBs)
Spatial direction information (e.g. azimuth, elevation etc.) of the DL-PRS Resources of the TRPs served by the gNB
Geographical coordinates of the TRPs served by the gNB (include a transmission reference location for each DL-PRS Resource ID, reference location for the transmitting antenna of the reference TRP, relative locations for transmitting antennas of other TRPs)
Set assignment of each TRP (Primary Set or Secondary Set)
Conditions relating to integrity evaluation of the Primary TRP set that triggers the UE to conduct measurement based on Secondary Set (e.g. required maximum error tolerance)

The conditions relating to integrity evaluation of the Primary TRP set may include at least one of the following examples:
  The maximum error tolerance required by the relevant application: the UE only conducts positioning based on the secondary TRP set if the estimation error from the primary TRP set exceeds this limit.
  The maximum likelihood of integrity risk (PL>AL): the UE only conducts positioning based on the secondary TRP set if the probability such that estimation error from the primary TRP set exceeds this limit is higher than the threshold.
  The minimum number of LoS path observed: the UE only conducts positioning based on the secondary TRP set if it cannot see enough number of LoS paths in the primary set of TRPs.

It is noted that other conditions than those listed above are also possible.

Based on the information received in the request, the UE can conduct first measurement and position estimation based on the primary set of TRPs. Then, the UE can evaluate whether the position estimate from the primary set of TRPs can provide satisfactory integrity performance. For instance, the LMF may have provided the maximum error tolerance that is required by the application. This can be defined, e.g., by alert limit. The UE may then evaluate if the position estimate error based on the primary TRP set exceeds the noted alert limit and determine if it should further conduct the positioning based on the secondary TRP set. The manner how the UE can evaluate the integrity performance can be implemented in various manners. Examples include observations of properties of radio conditions. For example, LoS conditions and/or signal strength in the primary set of TRPs can be determined. If the UE cannot see any LoS path with sufficiently strong signal strength in the primary TRP set, or determines that there are issues with the LoS, the UE may deem the primary TRP set as "not trustworthy" and move on to try measurements based on the secondary TRP set. The UE may, e.g., check the signal strength ratio between the first received path and second received path. If one of the TRPs in the set is identified to be "illegitimate" or "malicious", then UE may determine the obtained result is not trustworthy. There are many other factors that the UE may consider in determining the trustworthiness of the position estimates.

Figure 5:
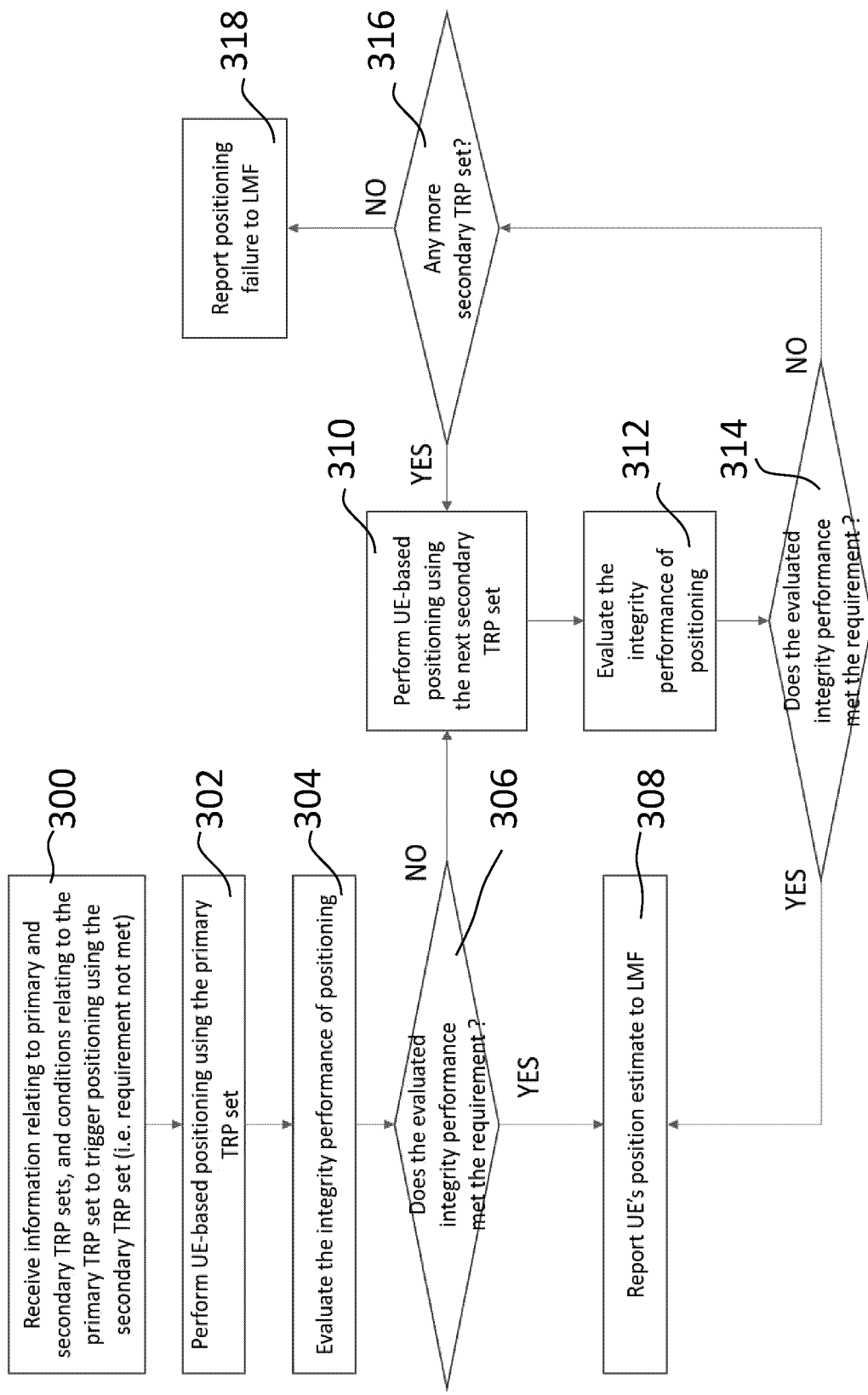

An example of the logical procedure at the UE side is illustrated by the flowchart of FIG. 5. In this example a primary set and a plurality of secondary sets are communicated to the UE at 300 where after the UE performs UE-based positioning at 302. Integrity performance is then evaluated at 304. As shown in FIG. 3, if it is determined at 306 that the primary TRP set provides a position estimate with required integrity, the requested position estimate can be reported at 308. If it is determined at 306 that the primary TRP set is not able to provide a position estimate with required integrity, the UE can in response thereto immediately move to step 310 and perform positioning based on a secondary TRP set.

A looped algorithm for testing a plurality of secondary sets can be provided. The integrity of a first secondary TRP set is evaluated at 312 and a decision is made at 314 whether the tested first secondary TRP set can provide a position estimate with required integrity. If yes, the operation moves to 308 and a position estimate based on the first secondary TRP set can be reported at 308. If no, the UE may move to 316 to see if there is a next secondary TRP set, and if yes, move back to step 310. The UE can continue and try all the secondary TRP sets in succession until a satisfactory positioning estimate is obtained, and the result can be reported to the LMF, or until there is no more secondary TRP sets available.

The UE may additionally indicate to the LMF which TRP set achieves the satisfactory results. This may be is useful for the LMF to record for future uses. If the UE determines that none of the TRP sets can provide satisfactory results, the UE may report positioning integrity failure at 318 to the LMF.

The reporting of the result can be handled by extending an existing protocol message. For example, new information elements (IEs) can be added to the 3GPP LTE Positioning Protocols (LPP) message for enabling the UE to report the results and other information to the LMF. Table 2 below shoes an example where Table 8.12.2.2-1 of 3GPP TS 38.305 V16.0.0 is extended with two new IEs (emphasised in bold):

TABLE 2

| Information | UE-assisted | UE-based |
|---|---|---|
| Latitude/Longitude/Altitude, together with uncertainty shape | No | Yes |
| PCI, GCI, and TRP ID for each measurement | Yes | Yes |
| DL RSTD measurement | Yes | No |
| DL PRS RSRP measurement | Yes | No |
| Time stamp of the measurement | Yes | No |
| Quality for each measurement | Yes | No |
| TRP set index of the reported position estimate | No | Yes |
| Indication of positioning integrity failure | No | Yes |

In accordance with an example selection diversity of position estimation can be provided at a UE based on two or more sets of TRPs provided by a LMF to the UE. The UE can then derive a multiple of position estimates based on the different TRP sets. The UE selects an estimate it determines to have the best integrity performance. For example, an estimate with the lowest likelihood of integrity risk is selected. This estimate is then reported to the LMF. In addition to the information that the LMF may provide to the UE to trigger the UE-based positioning, the LMF may further provide information relating to the TRP sets in each location request so that the UE can acquire information of multiple TRP sets directly. Moreover, the LMF may also provide instructions about how the UE shall determine which position estimate (among the multiple position estimates corresponding to different TRP sets) shall be chosen for the reporting.

An example of information that can be provided from the LMF to the UE is listed below in table 3. This example of information elements is extended from Table 8.12.2.1-1 of 3GPP TS 38.305 V16.0.0. The added two information elements are at the end (emphasised in bold).

TABLE 3

Information

Physical cell IDs (PCIs), global cell IDs (GCIs), and TRP IDs of candidate NR TRPs for measurement
Timing relative to the serving (reference) TRP of candidate NR TRPs
DL-PRS configuration of candidate NR TRPs
SSB information of the TRPs (the time/frequency occupancy of SSBs)
Spatial direction information (e.g. azimuth, elevation etc.) of the DL-PRS Resources of the TRPs served by the gNB
Geographical coordinates of the TRPs served by the gNB (include a transmission reference location for each DL-PRS Resource ID, reference location for the transmitting antenna of the reference TRP, relative locations for transmitting antennas of other TRPs)
Set assignment of each TRP
Guidelines/Rules for the UE to determine which position estimate (among multiple position estimates corresponding to different TRP sets) should be chosen for reporting

Examples for the rules for Position Estimate selection include the following:
  The UE shall report the position estimate with lowest error (e.g. the lowest PL)
  The UE shall report the position estimate with lowest likelihood of error exceeding the maximum tolerable error The UE shall report the position estimate corresponding to the TRP set wherein a largest number of LoS paths have been observed.
  The UE shall report the position estimate corresponding to the TRP set wherein a highest radio signal strength have been measured.

It is noted that other rules than those listed above are also possible.

Figure 6:
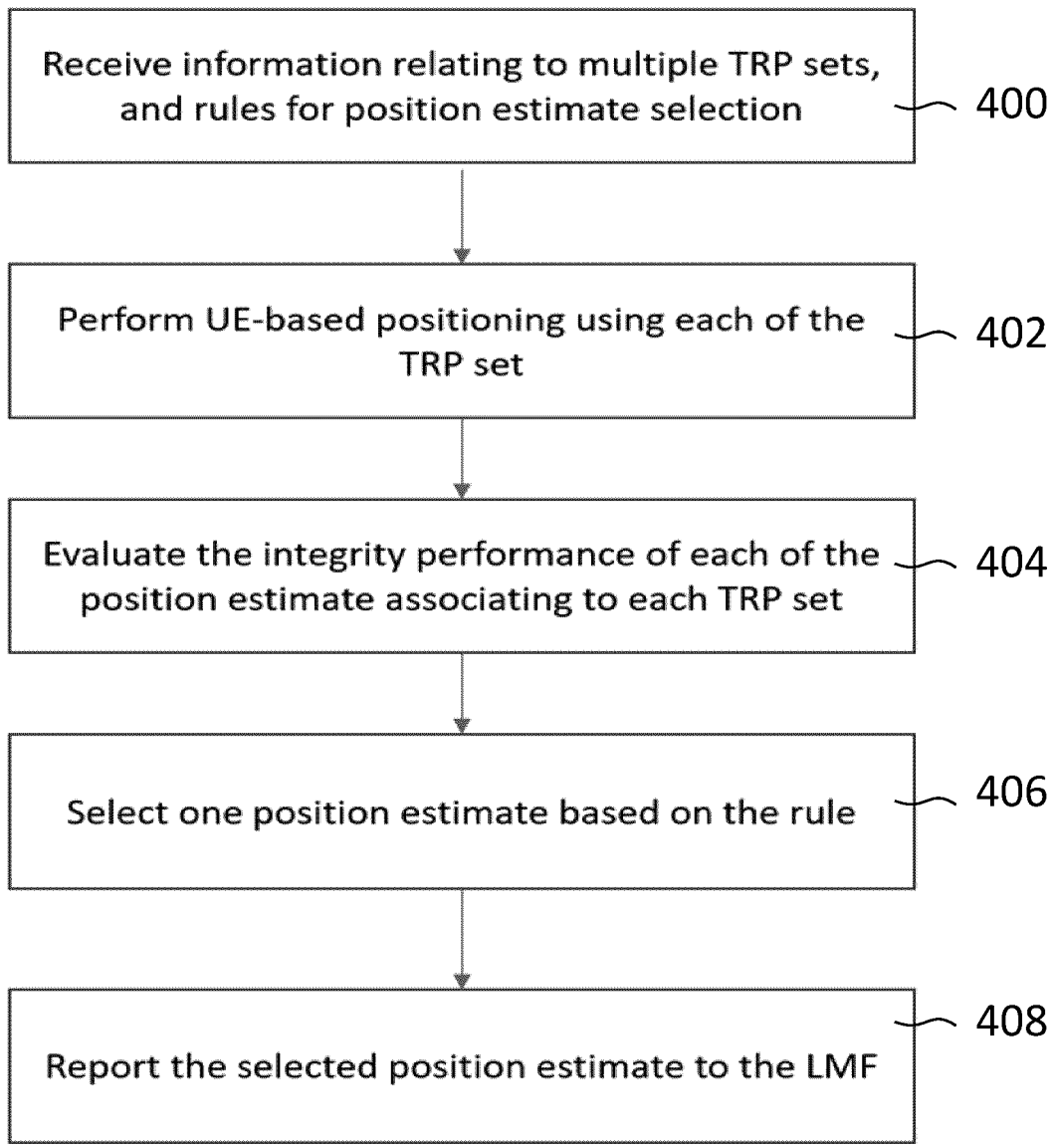

An example of the logical procedure at the UE side is illustrated by the flowchart of FIG. 6. The UE receives at 400 a plurality of sets of TRPs from a LMF. The UE can then at 402, based on the received information, conduct a multiple of position estimations across a plurality of TRP sets indicated by the LMF. Integrity performance is evaluated at 404 where after the UE can choose at 406 one of the obtained position estimates based on the rules instructed by the LMF for reporting at 408. The UE may also report more than one estimate. A predefined number of best estimates may have been requested by the LMF.

In terms of UE reporting, the UE can simply report the position estimate as in the existing LPP framework. However, the UE may report additional information. For example, the UE may additionally indicate the TRP set index, which provides the LMF with information which TRP set provides the best result. Failed TRPs may also be indicated. This may be useful for the LMF to select one or more TRP sets in the future. Extended reporting can be provided by means of additional information elements as explained with reference to table 2 above.

The above examples gave TRP sets as an example of radio access points, or more generally, radio accesses. Other radio accesses can also be indicated to be used as the basis of the position estimates. For example, a set of TX/RX (transmission/reception) beam configurations or spatial relations may be used. In applications where beamforming is applied, both the primary set and the secondary sets, or the multiple sets, could be associated to the same set of TRPs, but different beam configurations should be applied between the access point, e.g., gNB and the device for PRS transmission/reception. For instance, the device may use two different sets of RX beams to measure PRS and thereby derive two different position estimates.

It is noted that although the above examples have been described with reference to a user equipment (UE), similar principles can be applied to any device capable of positioning based on signals from radio access system.

It is also noted that while the above describes example embodiments, there are several variations and modifications which may be made to the disclosed solution without departing from the scope of the present invention. In particular, different embodiments have been described. Different features from different embodiments may be combined.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:
(a) hardware-only circuit implementations (such as implementations in only analogue and/or digital circuitry);
(b) combinations of hardware circuits and software, such as:
    (i) a combination of analogue and/or digital hardware circuit(s) with software/firmware and
    (ii) any portions of hardware processor(s) with software (including digital signal processor(s)), software, and memory(ies) that work together to cause the communications device and/or device and/or server and/or network entity to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

In the proposed methods a device, for example a UE can report a position estimate with the best/satisfactory integrity performance via multiple different sets of radio accesses at once. The location operation at the network system then does not have to spend time on making further requests and/or information exchange between LMF and UE. This way in shorter latency and increased availability of trustable positioning estimation results will be achieved.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

The invention claimed is:

1. An apparatus comprising:
at least one processor; and
at least one non-transitory memory including a computer program code,
the at least one memory storing instructions that, when executed with the at least one processor, cause the apparatus at least to:
    receive a request for information associated with location of the apparatus, the request comprising an indication of a plurality of sets of radio accesses and information of positioning integrity,
    determine based on the information of positioning integrity whether a position estimate based on a set of radio accesses of the indicated plurality of sets of radio accesses is to be reported in response to the request, and
    respond to the request according to the determining.

2. An apparatus according to claim 1, wherein the indication comprises a primary set of radio accesses and at least one secondary set of radio accesses.

3. An apparatus according to claim 2, where the instructions, when executed with the at least one processor, cause the apparatus at least to:
    derive a first position estimate based on the primary set of radio accesses,
    determine whether the first position estimate satisfies positioning integrity according to the information of positioning integrity,
    in response to determining that the first positioning estimate satisfies the positioning integrity according to the information of positioning integrity, report the first positioning estimate, and
    in response to determining that the first positioning estimate does not satisfy the positioning integrity according to the information of positioning integrity, derive at least one second positioning estimate based on the at least one secondary set of radio accesses.

4. An apparatus according to claim 1, where the instructions, when executed with the at least one processor, cause the apparatus at least to:
    derive position estimates for the indicated sets of radio accesses,
    determine at least one position estimate that satisfies positioning integrity according to the information of positioning integrity, and
    report the determined at least one position estimate.

5. An apparatus according to claim 4, where the instructions, when executed with the at least one processor, cause the apparatus at least to determine a position estimate with the best position integrity performance, and report the determined best position estimate.

6. An apparatus according to claim 1, where the instructions, when executed with the at least one processor, cause the apparatus at least to receive rules for selection of a position estimate for reporting, and select a position estimate amongst derived position estimates accordingly.

7. An apparatus according to claim 1, wherein the information of positioning integrity comprises at least one of:
the value of at least one of:
    maximum tolerable error,
    maximum likelihood of integrity risk,
    number of line of sight paths,
    alert limit,
    protection level,
    time to alert,
    integrity risk, or
    integrity event, or
a rule that the report shall include at least one of:
    the position estimate with lowest error,
    the position estimate with lowest likelihood of error exceeding a maximum tolerable error, or
    the position estimate corresponding to a set of radio accesses where a largest number of line of sight paths have been observed.

8. An apparatus according to claim 1, wherein the report comprises at least one of:
    indication of positioning integrity failure,
    index of the set of radio accesses associated with the reported position estimate, or
    index of a set of radio accesses associated a position estimate determined as integrity failure.

9. An apparatus according to claim 1, wherein the request comprises a positioning protocol request from a location management function of a 3GPP communication system, the radio accesses comprise transmit/receive points, user equipment, or TX/RX beam configurations or spatial relations according to a 3GPP radio access technology and the device comprises a user equipment configured for UE-assisted and/or UE-based positioning.

10. An apparatus for a communication system for obtaining information of a location of a device, comprising:
at least one processor; and
at least one non-transitory memory storing instructions that, when executed with the at least one processor, cause the apparatus at least to:
send, to the device to be located, a request for information associated with the location of the device, the request comprising an indication of a plurality of sets of radio accesses and information of positioning integrity, and
receive from the device a response comprising a position estimate determined with the device based on the information of positioning integrity, wherein the device has determined whether a position estimate based on a set of radio accesses of the indicated plurality of sets of radio accesses is to be reported in response to the request and responded the request according to the determining.

11. A method for determining location information for a device, comprising:
receiving, at the device, a request for information associated with the location of the device, the request comprising an indication of a plurality of sets of radio accesses and information of positioning integrity,
determining, with the device, based on the information of positioning integrity whether a position estimate based on a set of radio accesses of the indicated plurality of sets of radio accesses is to be reported in response to the request, and
responding the request according to the determining.

12. A method according to claim 11, wherein the indication comprises a primary set of radio accesses and at least one secondary set of radio accesses.

13. A method according to claim 12, comprising:
deriving a first position estimate based on the primary set of radio accesses,
determining whether the first position estimate satisfies positioning integrity according to the information of positioning integrity, and
in response to determining that the first positioning estimate satisfies the positioning integrity according to the information of positioning integrity, reporting the first positioning estimate, and in response to determining that the first positioning estimate does not satisfy the positioning integrity according to the information of positioning integrity, deriving at least one second positioning estimate based on the at least one secondary set of radio access points.

14. A method according to claim 11, comprising
deriving position estimates for the indicated sets of radio accesses,
determining at least one position estimate that satisfies positioning integrity according to the information of positioning integrity, and
reporting the determined at least one position estimate.

15. A method according to claim 14, comprising reporting a determined position estimate with the best position integrity performance.

16. A method according to claim 14, comprising receiving rules for selection of the position estimate for reporting, and selecting a position estimate of the derived position estimates accordingly.

17. A method according to claim 11, wherein the information of positioning integrity comprises at least one of:
the value of at least one of:
maximum tolerable error,
maximum likelihood of integrity risk,
number of line of sight paths,
alert limit,
protection level,
time to alert,
integrity risk, or
integrity event, or
a rule that the report shall include at least one of:
the position estimate with lowest error,
the position estimate with lowest likelihood of error exceeding a maximum tolerable error, or
the position estimate corresponding to a set of radio accesses where a largest number of line of sight paths have been observed.

18. A method according to claim 11, comprising reporting at least one of:
an indication of positioning integrity failure,
an index of the set of radio accesses associated with the reported position estimate, or
an index of a set of radio accesses associated a position estimate determined as integrity failure.

19. A non-transitory program storage device readable by an apparatus, tangibly embodying a program of instructions executable with the apparatus for performing operations, the operations comprising the method as claimed in claim 11.

* * * * *